(12) United States Patent
Tamai et al.

(10) Patent No.: US 7,763,692 B2
(45) Date of Patent: Jul. 27, 2010

(54) ULTRAVIOLET-CURING RESIN COMPOSITION, PAINT, INK, ADHESIVE, SEALING AGENT AND PRIMER

(75) Inventors: Toshiyuki Tamai, Nagaokakyo (JP); Mitsuru Watanabe, Moriguchi (JP); Kenji Kashihara, Takasago (JP); Takafumi Masuda, Osaka (JP)

(73) Assignees: Toyo Kasei Kogyo Company Limited, Osaka (JP); Osaka Municipal Technical Research Institute, Osaka (JP)

( * ) Notice: Subject to any disclaimer, the term of this patent is extended or adjusted under 35 U.S.C. 154(b) by 785 days.

(21) Appl. No.: 10/578,095

(22) PCT Filed: Nov. 1, 2004

(86) PCT No.: PCT/JP2004/016228

§ 371 (c)(1),
(2), (4) Date: Nov. 15, 2006

(87) PCT Pub. No.: WO2005/044914

PCT Pub. Date: May 19, 2005

(65) Prior Publication Data

US 2007/0093571 A1 Apr. 26, 2007

(30) Foreign Application Priority Data

Nov. 6, 2003 (JP) ............................. 2003-377424

(51) Int. Cl.
*C08F 14/14* (2006.01)
*C08F 18/00* (2006.01)
*C08F 20/00* (2006.01)
*C09D 11/00* (2006.01)
*C09D 5/00* (2006.01)

(52) U.S. Cl. ............... 526/291; 526/292.4; 526/292.95; 523/160; 523/161

(58) Field of Classification Search ................. 526/291, 526/292.4, 292.95, 371.1; 523/160, 161
See application file for complete search history.

(56) References Cited

U.S. PATENT DOCUMENTS 4,945,003 A * 7/1990 Poole et al. ................. 428/462

FOREIGN PATENT DOCUMENTS

| EP | 1 260 278 A2 * | 11/2002 |
|---|---|---|
| JP | 46-27489 B | 8/1971 |
| JP | 48-4534 A | 1/1973 |
| JP | 48-5507 A | 1/1973 |
| JP | 59-75958 A | 4/1984 |
| JP | 60-99138 A | 6/1985 |
| JP | 5-39398 A | 2/1993 |
| JP | 6-279706 A | 10/1994 |
| JP | 2002-348498 A | 12/2002 |

* cited by examiner

*Primary Examiner*—William K Cheung
(74) *Attorney, Agent, or Firm*—Kubovcik & Kubovcik

(57) ABSTRACT

An ultraviolet-curing resin composition of (a) 5 to 35 parts by mass of a chlorinated polyolefin with a chlorine content of 15 to 40 mass %, (b) 15 to 60 parts by mass of an alicyclic hydrocarbon mono(meth)acrylate, and (c) 5 to 80 parts by mass of a polypropylene glycol di(meth)acrylate; and, per 100 parts by mass of the total amount of components (a), (b) and (c), (d) 0 to 1100 parts by mass of an aliphatic hydrocarbon di(meth)acrylate and (e) 0 to 600 parts by mass of a polyfunctional monomer having 3 to 6 (meth)acryloyl groups in its molecule; and, per 100 parts by mass of the total amount of components (b), (c), (d) and (e), (f) 1 to 15 parts by mass of a photoinitiator; and
the composition as an active ingredient in paints, inks, adhesives, sealing agents and primers.

7 Claims, No Drawings

US 7,763,692 B2

ULTRAVIOLET-CURING RESIN COMPOSITION, PAINT, INK, ADHESIVE, SEALING AGENT AND PRIMER

This application is a 371 of international application PCT/JP2004/016228, which claims priority based on Japanese patent application No. 2003-377424 filed Nov. 6, 2003, which is incorporated herein by reference.

TECHNICAL FIELD

The present invention relates to ultraviolet-curing resin compositions used to protect or decorate films, sheets and molded articles comprising polyolefin resins such as polypropylene, polyethylene, ethylene-propylene copolymers, ethylene-propylene-diene copolymers, etc.

BACKGROUND ART

Generally, polyolefin resins are relatively inexpensive, have excellent chemical resistance, water resistance, heat resistance, etc., and are therefore used in a wide variety of applications, such as materials for automotive parts, electrical parts, building materials, food packaging films, etc. However, polyolefin resins with such excellent properties are crystalline and non-polar, and thus coating or bonding these resins are difficult.

To coat or bond such low-adhesion polyolefin resins, chlorinated polyolefins exhibiting strong adhesion to polyolefin resins have been heretofore used as binder resins. For example, an isotactic polypropylene chlorinated to a chlorine content of 20 to 40 wt. % has been proposed as a binder resin for printing inks for polypropylene films (JP 46-27489 B). Further, propylene-ethylene copolymers chlorinated to a chlorine content of 20 to 40 wt. % have been proposed as binder resins for printing inks or adhesives for polyolefins (JP 48-5507 A and JP 48-4534 A).

Furthermore, carboxylic acid- and/or carboxylic anhydride-containing low-chlorinated propylene-α-olefin copolymers with a chlorine content of 5 to 50 wt. % have been proposed as binder resins for primers and coating materials for polyolefin molded articles (JP 59-75958 A and JP 60-99138 A).

However, since such chlorinated polyolefins are usually used in the form of solutions in organic solvents such as toluene, xylene, etc., a large amount of organic solvent is released into the air during coating application, polluting the environment and causing hygiene problems. Moreover, film formation using such solutions requires high-temperature long-time drying, and thus has low production efficiency.

DISCLOSURE OF INVENTION

Problems to be Solved by the Invention

An object of the present invention is to provide an ultraviolet-curing resin composition for paints, inks, adhesives, sealing agents and primers which has good adhesion to polyolefins, contains no organic solvent and provides high working efficiency.

Means for Solving the Problems

The present invention provides the following ultraviolet-curing resin compositions, paint, ink, adhesive, sealing agent and primer.

1. An ultraviolet-curing resin composition comprising (a) 5 to 35 parts by mass of a chlorinated polyolefin with a chlorine content of 15 to 40 mass %, (b) 15 to 60 parts by mass of an alicyclic hydrocarbon mono(meth)acrylate, and (c) 5 to 80 parts by mass of a polypropylene glycol di(meth)acrylate;

and further containing, per 100 parts by mass of the total amount of components (a), (b) and (c), (d) 0 to 1100 parts by mass of an aliphatic hydrocarbon di(meth)acrylate and (e) 0 to 600 parts by mass of a polyfunctional monomer having 3 to 6 (meth)acryloyl groups in its molecule;

and further containing, per 100 parts by mass of the total amount of components (b), (c), (d) and (e), (f) 1 to 15 parts by mass of a photoinitiator.

2. The ultraviolet-curing resin composition according to item 1, wherein the chlorinated polyolefin (a) contains 0.3 to 10 mass % of at least one member selected from the group consisting of unsaturated carboxylic acid moieties and unsaturated carboxylic anhydride moieties.

3. A paint for films, sheets or molded articles of polyolefins, the paint comprising the ultraviolet-curing resin composition according to item 1 or 2 as an active ingredient.

4. An ink for films, sheets or molded articles of polyolefins, the ink comprising the ultraviolet-curing resin composition according to item 1 or 2 as an active ingredient.

5. An adhesive for films, sheets or molded articles of polyolefins, the adhesive comprising the ultraviolet-curing resin composition according to item 1 or 2 as an active ingredient.

6. A sealing agent for films, sheets or molded articles of polyolefins, the sealing agent comprising the ultraviolet-curing resin composition according to item 1 or 2 as an active ingredient.

7. A primer for coating polyolefin resins, the primer comprising the ultraviolet-curing resin composition according to item 1 or 2 as an active ingredient.

The present invention is described below in detail.

The ultraviolet-curing resin composition of the present invention comprises, as essential components, a chlorinated polyolefin (a), an alicyclic hydrocarbon mono(meth)acrylate (b), a polypropylene glycol di(meth)acrylate (c) and a photoinitiator (f); and contains, as optional components, an aliphatic hydrocarbon di(meth)acrylate (d) and a polyfunctional monomer (e) having 3 to 6 (meth)acryloyl groups in its molecule.

As used herein, "(meth)acrylate" means "acrylate or methacrylate"; "(meth) acrylic acid" means "acrylic acid or methacrylic acid"; and "(meth)acryloyl group" means "acryloyl group or methacryloyl group".

The chlorinated polyolefin used as component (a) in the present invention has a chlorine content of 15 to 40 mass %. With a chlorine content of less than 15 mass %, the polyolefin has poor solubility in acrylate components, making it impossible to obtain a composition with good fluidity. When the chlorine content is more than 40 mass %, the resulting composition has low adhesion to substrates.

Preferable examples of polyolefins for use as materials for production of chlorinated polyolefins include polypropylene, propylene-α-olefin random copolymers, etc., among which propylene-α-olefin random copolymers produced by using metallocene catalysts are especially preferable.

Examples of α-olefins in propylene-α-olefin random copolymers include $C_2$ or $C_{4-20}$ α-olefins, such as ethylene, 1-butene, 1-pentene, 1-hexene, 1-heptene, 1-octene, 1-decene, 1-dodecene, 1-hexadecene, 4-methyl-1-pentene, etc., among which ethylene is preferable. Two or more α-olefins may be used.

Polyolefins may be chlorinated by known methods, for example, a method in which the polyolefin is dissolved in a chlorination reaction solvent and reacted by bubbling chlorine gas into the solution in the presence of a catalyst or by ultraviolet irradiation at atmospheric pressure or under pressure at 50 to 150° C.

Usable catalysts for such a chlorination reaction include, for example, tert-butyl peroxy-2-ethylhexanoate, di-tert-butyl peroxide, benzoyl peroxide, dicumyl peroxide, tert-butylcumyl peroxide, dilauryl peroxide, tert-butyl hydroperoxide, cyclohexanone peroxide, tert-butyl peroxybenzoate, cumene hydroperoxide, tert-butyl peroxyisobutyrate and other peroxides; azobisisobutyronitrile, azobisisopropionitrile and other azonitriles; etc.

Examples of solvents usable for the chlorination reaction include halogenated solvents, such as, for example, tetrachloroethylene, chloroform and other halogenated hydrocarbons, among which chloroform is especially preferable.

When the chlorinated polyolefin for use as component (a) in the present invention contains at least one member selected from the group consisting of unsaturated carboxylic acid moieties (units) and unsaturated carboxylic anhydride moieties (units), the resulting composition has improved pigment dispersibility and improved compatibility with other polar resins. Furthermore, when the resulting composition is used as a primer, it improves the adhesion of the overcoating paint. The content of said at least one member selected from the group consisting of unsaturated carboxylic acid moieties and unsaturated carboxylic anhydride moieties is preferably 0.3 to 10 mass %. When the content is more than 10 mass %, the resulting composition may have poor physical properties.

The chlorinated polyolefin containing at least one member selected from the group consisting of unsaturated carboxylic acid moieties (units) and unsaturated carboxylic anhydride moieties (units) (hereinafter also referred to as "carboxy-containing chlorinated polyolefin") can be produced by, for example, graft polymerization of at least one member selected from the group consisting of unsaturated carboxylic acids and anhydrides thereof (hereinafter also referred to as "unsaturated carboxylic monomer") onto a polyolefin, followed by chlorination; chlorination of a polyolefin, followed by graft polymerization of at least one unsaturated carboxylic monomer onto the chlorinated polyolefin; and other methods.

Graft polymerization of an unsaturated carboxylic monomer onto a polyolefin can be performed by known methods, such as a method in which the polyolefin is melted by heating to a temperature not lower than the melting point in the presence of a radical initiator to carry out a reaction (melting method); a method in which the polyolefin is dissolved in an organic solvent and heated with stirring in the presence of a radical initiator to carry out a reaction (solution method); etc.

Since the melting method is performed by using a Banbury mixer, kneader, extruder or the like and carrying out the reaction at a temperature not lower than the melting point and not higher than 300° C., the method has the advantages of easy operation and short reaction time. In the solution method, it is preferable to use an aromatic solvent, such as toluene, xylene or the like, as the reaction solvent. In the method, the reaction is carried out at 100 to 180° C., little side reaction occurs, and a homogeneous graft polymer can be obtained.

Examples of radical initiators usable for the reaction include di-tert-butyl perphthalate, tert-butyl hydroperoxide, dicumyl peroxide, benzoyl peroxide, tert-butyl peroxybenzoate, tert-butyl peroxypivalate, methyl ethyl ketone peroxide, di-tert-butyl peroxide and other peroxides; azobisisobutyronitrile, azobisisopropionitrile and other azonitriles; etc.

Examples of unsaturated carboxylic monomers usable for the reaction include maleic acid, maleic anhydride, fumaric acid, citraconic acid, citraconic anhydride, mesaconic acid, itaconic acid, itaconic anhydride, aconitic acid, aconitic anhydride, himic anhydride, etc.

The polyolefin (hereinafter also referred to as "carboxy-containing polyolefin") thus obtained by graft polymerization of an unsaturated carboxylic monomer is chlorinated by a chlorination method as mentioned above to obtain a carboxy-containing chlorinated polyolefin.

When a polyolefin is first chlorinated and then an unsaturated carboxylic monomer is graft-polymerized onto the chlorinated polyolefin, the graft polymerization can be performed by following the above-mentioned solution method, but in such a case, a preferable reaction temperature is 60 to 120° C. Too low a reaction temperature makes the reaction slow, whereas too high a reaction temperature results in decomposition of the chlorinated polyolefin. Thus, too high or low reaction temperatures are not preferable.

Examples of alicyclic hydrocarbon mono(meth)acrylates usable as component (b) in the present invention include cyclopentyl(meth)acrylate, cyclohexyl(meth)acrylate, isobornyl (meth)acrylate, dicyclopentanyl(meth)acrylate, dicyclopentenyl (meth)acrylate, etc. These can be used singly or in combination.

The polypropylene glycol di(meth)acrylate for use as component (c) in the present invention can be obtained by reacting polypropylene glycol with (meth)acrylic acid. The number of moles of propylene oxide constituting the polypropylene glycol is 2 to 20 moles. Such polypropylene glycol di(meth)acrylates can be used singly or in combination.

Examples of aliphatic hydrocarbon di(meth)acrylates that can be optionally used as component (d) in the present invention include 1,3-propanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, 3-methyl-1,5-pentanediol di(meth)acrylate, 2-butyl-2-ethyl-1,3-propanediol di(meth)acrylate, 2-methyl-1,8-octanediol di(meth)acrylate, tricyclodecanedimethanol di(meth)acrylate, etc. These can be used singly or in combination.

Examples of polyfunctional monomers having 3 to 6 (meth)acryloyl groups in its molecule that can be optionally used as component (e) in the present invention include trimethylolpropane tri(meth)acrylate, pentaerythritol tetra(meth)acrylate, ditrimethylolpropane tetra(meth)acrylate, dipentaerythritol hexa(meth)acrylate, etc. These can be used singly or in combination.

Examples of photoinitiators usable as component (f) in the present invention include benzophenone, p-dimethylaminobenzophenone, p-chlorobenzophenone, benzophenone methyl ether, methylbenzophenone, 4,4-dichlorobenzophenone, 4,4-bis(diethylamino)benzophenone, benzoin, benzoin methyl ether, benzoin ethyl ether, benzoin isobutyl ether, benzoin isopropyl ether, α-methylbenzoin, benzoin n-butyl ether, 2-ethylanthraquinone, 2-tert-butylanthraquinone, 1-chloroanthraquinone, 2-amylanthraquinone, 2-aminoanthraquinone, 2,4-dimethylthioxanthone, 2,4-diisopropylthioxanthone, 2,4-diethylthioxanthone, 2-chlorothioxanthone, 2-isopropylthioxanthone, 2,2-dimethoxy-2-phenylacetophenone, α, α-dichloro-4-phenoxyacetophenone, p-tert-butyltrichloroacetophenone, p-tert-butyldichloroacetophenone, 2,2-diethoxyacetophenone, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)butanone-1, bis(2,4,6-trimethylbenzoyl)phenylphosphine oxide, bis(2,6-dimethoxybenzoyl)-2,4,4-trimethylpentylphosphine oxide, 2,4,6-trimethylbenzoyldiphenylphosphine oxide, etc. These can be used singly or in combination.

To produce the ultraviolet-curing resin composition of the present invention, the above-mentioned chlorinated polyolefin may be first dried to a solid and then dissolved in the alicyclic hydrocarbon mono(meth)acrylate (b) and polypropylene glycol di(meth)acrylate (c), or alternatively, after the completion of the chlorination reaction or graft polymerization reaction, the chlorination solvent or graft polymerization solvent may be distilled off and replaced with the alicyclic hydrocarbon mono(meth)acrylate (b) and polypropylene glycol di(meth)acrylate (c).

The chlorinated polyolefin (a) content in the ultraviolet-curing resin composition of the present invention is preferably 5 to 35 mass % of the total amount of components (a), (b) and (c). When the chlorinated polyolefin content is less than 5 mass %, the composition may have insufficient adhesion to the substrate, whereas when the content is more than 35 mass %, it may become difficult to dissolve the chlorinated polyolefin, and the resulting composition may have a high viscosity and thus exhibit poor coating workability. This also applies to the case where the chlorinated polyolefin (a) contains at least one member selected from the group consisting of unsaturated carboxylic acid moieties and unsaturated carboxylic anhydride moieties.

The alicyclic hydrocarbon mono(meth)acrylate (b) content in the ultraviolet-curing resin composition of the present invention is preferably 15 to 60 mass % of the total amount of components (a), (b) and (c). When the alicyclic hydrocarbon mono(meth)acrylate content is less than 15 mass %, the composition may have insufficient adhesion and/or wettability to the substrate, whereas when the content is more than 60 mass %, the cured coating film may shrink greatly, showing poor adhesion.

The polypropylene glycol di(meth)acrylate (c) content in the ultraviolet-curing resin composition of the present invention is preferably 5 to 80 mass % of the total amount of components (a), (b) and (c). When the content is less than 5 mass %, the cured coating film may shrink greatly and show poor adhesion, whereas when the content is more than 80 mass %, a soft cured coating film may result.

The aliphatic hydrocarbon di(meth)acrylate (d) is an optional component of the ultraviolet-curing resin composition of the present invention, and can be selected and used as required to increase the hardness of the cured coating film. The content of component (d) is not more than 1100 parts by mass per 100 parts by mass of the total amount of components (a), (b) and (c). When the content is more than 1100 parts by mass, the composition may have low adhesion.

The polyfunctional monomer (e) having 3 to 6 (meth)acryloyl groups in its molecule is an optional component of the ultraviolet-curing resin composition of the present invention, and can be selected and used as required to increase the hardness of the cured coating film. The polyfunctional monomer content in the composition is not more than 600 parts by mass per 100 parts by mass of the total amount of components (a), (b) and (c). When the polyfunctional monomer content is more than 600 parts by mass, the solubility of the chlorinated polyolefin may be reduced.

The photoinitiator (f) content in the ultraviolet-curing resin composition of the present invention is 1 to 15 parts by mass per 100 parts by mass of the total amount of components (b), (c), (d) and (e). When the content is less than 1 part by mass, the coating of the composition may not be sufficiently cured, whereas photoinitiator contents of more than 15 parts by mass are uneconomical.

The ultraviolet-curing resin composition of the present invention may contain an epoxy compound as a stabilizer, in order to trap hydrochloric acid that may be generated from the chlorinated polyolefin (a) by dehydrochlorination. Examples of such epoxy compounds include phenyl glycidyl ether, 2-methylphenyl glycidyl ether, tert-butylphenyl glycidyl ether, 4-chlorophenyl glycidyl ether, 4-methoxyphenyl glycidyl ether, 2-biphenyl glycidyl ether, 1-naphthyl glycidyl ether, methyl glycidyl ether, isopropyl glycidyl ether, butyl glycidyl ether, tert-butyl glycidyl ether, 2-ethyl glycidyl ether, ethylene glycol diglycidyl ether, diethylene glycol diglycidyl ether, polyethylene glycol #200 diglycidyl ether, polyethylene glycol #400 diglycidyl ether, propylene glycol diglycidyl ether, tripropylene glycol diglycidyl ether, polypropylene glycol #400 diglycidyl ether, neopentyl glycol diglycidyl ether, 1,6-hexanediol diglycidyl ether, glycerin diglycidyl ether, trimethylolpropane triglycidyl ether, etc. The epoxy compound content is preferably 1 to 10 parts by mass per 100 parts by mass of the chlorinated polyolefin (a). When the epoxy compound content is less than 1 part by mass, hydrochloric acid may not be sufficiently trapped, whereas when the content is more than 10 parts by mass, the resulting composition may have insufficient adhesion to the substrate.

The ultraviolet-curing resin composition of the present invention can be applied to a substrate by a method such as brush coating, air spray coating, electrostatic coating, immersion coating, dip coating, spin coating, curtain coating or the like. The substrate thus coated is irradiated with ultraviolet rays to form a cured coating film.

For ultraviolet irradiation, equipment conventionally used in the art, such as high pressure mercury lamps, metal halide lamps, etc. can be used.

The ultraviolet-curing resin composition of the present invention can be used as binder compositions for paints, inks, adhesives, sealing agents and the like for films, sheets, molded articles and other products of polyolefins. The composition can also be used as a primer for coating polyolefin resins.

The ultraviolet-curing resin composition of the present invention may be used by itself for coating, or a pigment or other additives may be added, kneaded and dispersed in the composition to obtain a paint or ink. If necessary, a urethane, polyester, epoxy or acrylic oligomer acrylate may be mixed with the composition to impart heat resistance and/or flexibility and/or to improve pigment dispersibility.

EFFECTS OF THE INVENTION

The ultraviolet-curing resin composition of the present invention has good adhesion to polyolefins. Further, since the composition is free of organic solvents, it entails less burden on the environment. Furthermore, the composition can be cured by short-time ultraviolet irradiation, thus providing high working efficiency. The composition of the present invention is therefore useful as an ultraviolet-curing resin composition for paints, inks, adhesives, sealing agents and primers.

BEST MODE FOR CARRYING OUT THE INVENTION

The following Production Examples and Examples are given to illustrate the present invention in further detail, and are not intended to limit the scope of the invention.

Production Example 1

280 g of a propylene-ethylene copolymer (ethylene content=4.4 mol %) prepared by using a metallocene catalyst, and 2520 g of chloroform were placed in an autoclave equipped with a stirrer. After purging with nitrogen for about 5 minutes, the mixture in the autoclave was heated to 110° C. to fully dissolve the resin. Subsequently, 1.4 g of tert-butyl peroxy-2-ethylhexanoate was added, and chlorine gas was bubbled into the resulting mixture to achieve a chlorine content of 30 mass %. After distilling off some of the chloroform used as the reaction solvent under reduced pressure, p-tert-butylphenyl glycidyl ether was added as a stabilizer, in a proportion of 5 mass % relative to the resin solids content. The chloroform was then completely removed by vacuum drying to obtain a solid chlorinated polyolefin.

Production Example 2

A similar procedure to Production Example 1 was followed to obtain a solid chlorinated polyolefin with a chlorine content of 15 mass %.

Production Example 3

A similar procedure to Production Example 1 was followed to obtain a solid chlorinated polyolefin with a chlorine content of 40 mass %.

Production Example 4

280 g of an isotactic polypropylene with a meso-pentad fraction mmmm of 0.95 and MFR (melt flow rate) of 20, 16.8 g of maleic anhydride, 5.6 g of di-tert-butyl peroxide and 420 g of toluene were placed in an autoclave equipped with a stirrer. After purging with nitrogen for about 5 minutes, reaction was carried out at 140° C. for 5 hours with heating and stirring. After completion of the reaction, the reaction mixture was poured into a large amount of methyl ethyl ketone to precipitate a resin. The resin was further washed several times with methyl ethyl ketone to remove unreacted maleic anhydride. After drying under reduced pressure, 280 g of the obtained maleic anhydride-modified polypropylene and 2520 g of chloroform were placed in an autoclave equipped with a stirrer. After purging with nitrogen for about 5 minutes, the mixture in the autoclave was heated to 110° C. to fully dissolve the resin. Subsequently, 1.4 g of tert-butyl peroxy-2-ethylhexanoate was added, and chlorine gas was bubbled into the resulting mixture. After a predetermined amount of chlorine had been bubbled into the mixture, some of the chloroform used as the reaction solvent was distilled off under reduced pressure, and tert-butylphenyl glycidyl ether was added as a stabilizer to the concentrated solution, in a proportion of 5 mass % relative to the resin solids content. The solution was dried under reduced pressure to completely remove the chloroform, to thereby obtain a solid maleic anhydride-modified chlorinated polyolefin having a chlorine content of 30 mass % and containing 1.3 mass % of a maleic anhydride moiety and maleic acid moiety combined.

Example 1

Twenty parts by mass of the solid chlorinated polyolefin obtained in Production Example 1 was added to 60 parts by mass of isobornyl acrylate and 20 parts by mass of polypropylene glycol diacrylate (number of moles of propylene oxide constituting the polypropylene glycol diacrylate=9 mol; product of Nippon Oil & Fats Co., Ltd.; tradename "ADP-400"), and dissolved at 80° C. for 1 hour. After cooling the solution, 4 parts by mass of 2,2-dimethoxy-1,2-diphenylethan-1-one (product of Ciba Speciality Chemicals, Inc.; tradename "Irgacure 651") was added as a photoinitiator and dissolved. The solution was applied with a bar coater #32 to an untreated OPP (biaxially oriented polypropylene) film degreased with isopropyl alcohol, and irradiated with ultraviolet rays for 5 seconds from a distance of 4 cm using a "Multilight ML-251 A/B" (tradename of Ushio Inc). Crosswise cuts reaching the substrate were made at intervals of 1 mm on the cured coating surface to form 100 squares. Cellophane tape was pressed onto the cut surface, and then peeled off at an angle of 90° relative to the coating surface. The number of remaining squares was counted to evaluate the adhesion. Table 1 shows the results of adhesion evaluation.

Examples 2 to 9 and Comparative Examples 1 to 4

Resin compositions were prepared by following the procedure of Example 1 and using the components shown in Tables 1 and 2 in the amounts (parts by mass) indicated, and tested for adhesion. The Test results are shown in Tables 1 and 2.

TABLE 1

|  | Ex. 1 | Ex. 2 | Ex. 3 | Ex. 4 | Ex. 5 | Ex. 6 | Ex. 7 |
|---|---|---|---|---|---|---|---|
| Resin of Prod. Ex. 1 | 20 | 5 | 35 | 5 | 5 | 5 |  |
| Resin of Prod. Ex. 2 |  |  |  |  |  |  | 5 |
| Resin of Prod. Ex. 3 |  |  |  |  |  |  |  |
| Resin of Prod. Ex. 4 |  |  |  |  |  |  |  |
| IBOA | 60 | 15 |  | 15 | 15 |  | 15 |
| CHA |  |  | 15 |  |  | 15 |  |
| ADP-400 | 20 | 80 | 50 | 80 |  | 80 |  |
| 12PGDA |  |  |  |  | 80 |  | 80 |
| NPGDA |  |  |  |  |  | 500 |  |
| HDDA |  |  |  | 1100 | 500 |  | 500 |
| TMPTA |  |  |  |  | 600 |  |  |
| DPEHA |  |  |  |  |  | 600 | 600 |
| Irgacure 651 | 4 | 5 | 3 | 60 | 60 | 60 | 60 |
| Adhesion (number of remaining squares/100) | 100/100 | 100/100 | 100/100 | 100/100 | 100/100 | 100/100 | 100/100 |

TABLE 2

|  | Ex. 8 | Ex. 9 | Comp. Ex. 1 | Comp. Ex. 2 | Comp. Ex. 3 | Comp. Ex. 4 |
|---|---|---|---|---|---|---|
| Resin of Prod. Ex. 1 |  |  | 5 |  | 5 | 5 |
| Resin of Prod. Ex. 2 |  |  |  | 40 |  |  |
| Resin of Prod. Ex. 3 | 5 |  |  |  |  |  |
| Resin of Prod. Ex. 4 |  | 5 |  |  |  |  |
| IBOA |  | 15 |  | 55 |  | 15 |
| CHA | 15 |  | 10 |  | 15 |  |
| ADP-400 | 80 |  | 85 |  | 80 |  |
| 12PGDA |  | 80 |  | 5 |  | 80 |
| NPGDA | 500 |  |  |  | 1200 |  |
| HDDA |  | 500 |  |  |  | 500 |
| TMPTA | 600 |  |  |  |  | 700 |
| DPEHA |  | 600 |  |  |  |  |
| Irgacure 651 | 60 | 60 | 5 | 3 | 65 | 65 |

TABLE 2-continued

|  | Ex. 8 | Ex. 9 | Comp. Ex. 1 | Comp. Ex. 2 | Comp. Ex. 3 | Comp. Ex. 4 |
|---|---|---|---|---|---|---|
| Adhesion (number of remaining squares/100) | 100/100 | 100/100 | 50/100 | — | 60/100 | — |

The abbreviations used in Tables 1 and 2 mean the following. IBOA: isobornyl acrylate; CHA: cyclohexyl acrylate; ADP-400: polypropylene glycol diacrylate (number of moles of propylene oxide constituting the polypropylene glycol diacrylate=9 mol); 12PGDA: polypropylene glycol diacrylate (number of moles of propylene oxide constituting the polypropylene glycol diacrylate=12 mol); NPGDA: neopentyl glycol diacrylate; HDDA: hexanediol diacrylate; TMPTA: trimethylolpropane triacrylate; DPEHA: dipentaerythritol hexaacrylate.

In Comparative Examples 2 and 4, the obtained compositions contained undissolved resin and thus were not applied to the untreated OPP (biaxially oriented polypropylene) film.

The invention claimed is:

1. An ultraviolet-curing resin composition comprising (a) 5 to 35 parts by mass of a chlorinated polyolefin with a chlorine content of 15 to 40 mass %, (b) 15 to 60 parts by mass of an alicyclic hydrocarbon mono(meth)acrylate, and (c) 5 to 80 parts by mass of a polypropylene glycol di(meth)acrylate;

and further containing, per 100 parts by mass of the total amount of components (a), (b) and (c), (d) 0 to 1100 parts by mass of an aliphatic hydrocarbon di(meth)acrylate and (e) 0 to 600 parts by mass of a polyfunctional monomer having 3 to 6 (meth)acryloyl groups in its molecule;

and further containing, per 100 parts by mass of the total amount of components (b), (c), (d) and (e), (f) 1 to 15 parts by mass of a photoinitiator;

and further containing, per 100 parts by mass of component (a), 1 to 10 parts by mass of an epoxy compound.

2. The ultraviolet-curing resin composition according to claim 1, wherein the chlorinated polyolefin (a) contains 0.3 to 10 mass % of at least one member selected from the group consisting of unsaturated carboxylic acid moieties and unsaturated carboxylic anhydride moieties.

3. A paint for films, sheets or molded articles of polyolefins, the paint comprising the ultraviolet-curing resin composition according to claim 1 as an active ingredient.

4. An ink for films, sheets or molded articles of polyolefins, the ink comprising the ultraviolet-curing resin composition according to claim 1 as an active ingredient.

5. An adhesive for films, sheets or molded articles of polyolefins, the adhesive comprising the ultraviolet-curing resin composition according to claim 1 as an active ingredient.

6. A sealing agent for films, sheets or molded articles of polyolefins, the sealing agent comprising the ultraviolet-curing resin composition according to claim 1 as an active ingredient.

7. A primer for coating polyolefin resins, the primer comprising the ultraviolet-curing resin composition according to claim 1 as an active ingredient.

* * * * *